United States Patent [19]

Sakakibara et al.

[11] 4,137,349

[45] Jan. 30, 1979

[54] PROCESS FOR FORMING MULTI-LAYER COATINGS

[75] Inventors: Takao Sakakibara, Kasugai; Haruhiko Okazaki, Iwakura, both of Japan

[73] Assignee: Dai Nippon Toryo Co., Ltd., Osaka, Japan

[21] Appl. No.: 752,086

[22] Filed: Dec. 20, 1976

[30] Foreign Application Priority Data

Dec. 26, 1975 [JP] Japan ................................ 50-155964

[51] Int. Cl.[2] ........................ B32B 15/00; D02G 3/00

[52] U.S. Cl. .................................... 427/380; 427/379; 427/386; 427/388 A; 427/388 C; 427/409; 427/410

[58] Field of Search ................... 427/407 R, 409, 410, 427/383 R, 383 C, 385 R, 386, 388 C, 388 A, 379, 380; 428/457

[56] References Cited

U.S. PATENT DOCUMENTS

| | | | |
|---|---|---|---|
| 2,198,939 | 4/1940 | Hempel | 427/409 |
| 2,878,141 | 3/1959 | Canniff | 427/409 |
| 3,089,783 | 5/1963 | Carlson et al. | 427/421 |
| 3,134,688 | 5/1964 | Hempel | 427/385 R |
| 3,156,580 | 11/1964 | Howard | 427/407 R |
| 3,446,652 | 5/1969 | Smith | 427/374 |
| 3,713,872 | 1/1973 | Porter et al. | 427/407 R |
| 3,787,230 | 1/1974 | Hoffman et al. | 427/336 |
| 3,864,153 | 2/1975 | Enomoto | 427/407 R |
| 3,870,546 | 3/1975 | Gelsomino | 427/409 |
| 3,904,795 | 9/1975 | Mercurio | 427/409 |
| 3,953,643 | 4/1976 | Cheung et al. | 427/388 C |
| 3,953,644 | 4/1976 | Camelon et al. | 427/410 |

FOREIGN PATENT DOCUMENTS

| | | | |
|---|---|---|---|
| 745349 | 2/1956 | United Kingdom | 427/407 R |

*Primary Examiner*—Michael F. Esposito
*Assistant Examiner*—Sadie L. Childs
*Attorney, Agent, or Firm*—Bucknam and Archer

[57] ABSTRACT

The present invention relates to a process for forming a multi-layer coating including at least two coating layers by performing the oven drying step at one time, which comprises applying a slurry paint comprising synthetic resin particles dispersed in an aqueous medium, to an undried coating which is in the non-fluid state but is not completely dried.

9 Claims, No Drawings

PROCESS FOR FORMING MULTI-LAYER COATINGS

DESCRIPTION OF THE PRIOR ART

A multi-layer coating finish process for forming multi-layer coatings including at least two layers, for example, a base coat, an undercoat, an intercoat and a topcoat, is being applied in various fields, for example, in the automobile, light electrical appliance, plywood and other industries.

For example, when automobiles are coated, a primer is first applied in order to improve the adhesion between the resulting coating and the metal substrate, an intercoat (surfacer) is then formed on the primer layer in order to prevent convexities and concavities on the surface of the primer layer from being manifested on the surface of the final coating and to smoothen the coating surface, and finally, a topcoat paint is applied to the surface layer to form a coating excellent in such properties as surface smoothness and gloss.

In an industrial coating line employing a multilayer coating process, it is necessary to perform the sequence of coating operations for formation of multi-layer coatings without a break and to complete these operations in a short time, and there have heretofore been adopted a multi-layer coating process in which at each coating step the formed coating layer is completely dried and the next coating paint is applied on the resulting dry film, and a multi-layer coating process called "two-coat-one-bake process" in which a paint is is applied on a precedingly applied coating layer while it is in the undried state and the entire coating is dried by one baking operation.

In the former process, however, since drying must be conducted at each coating step, the following disadvantages are brought about:

(1) The number of steps increases and a long time is required for completion of formation of the intended multi-layer coating.

(2) The number of drying ovens which must be disposed on a single coating line increases and therefore, a large space is occupied by these drying ovens and a large quantity of heat energy becomes necessary.

(3) Since a paint is applied to the surface of a dried coating film, the intercoat adhesion between adjacent coating layers is poor and it is often necessary to sand the dried coating film surface so as to improve this intercoat adhesion.

Since solvent type paints are used, the latter process involves the following defects:

(1) The working atmosphere is contaminated and there are risks of fire and explosion. Such contamination and risks are increased especially by a paint for forming a lower coating layer because it contains a low-boiling-point solvent in order to quicken drying.

(2) Solvent type paints run against recent trends favoring paints which are anti-polluting and conserve resources. Accordingly, it is necessary to provide an exhaust gas treatment apparatus or solvent recovery apparatus in the coating line, resulting in increase of the coating cost.

(3) In a paint for forming an upper layer, applicable solvents are limited because it is necessary to use a solvent which does not dissolve or swell the lower coating layer. As a result, applicable resins are also limited to those soluble in such specific solvent. Therefore, it is impossible to obtain a coating excellent in such properties as solvent resistance, water resistance, adhesion and corrosion resistance.

Further, when a heretofore customarily used solvent type paint or water-soluble or emulsion paint is applied to an undried coating and the coating layers are baked at one time, there are brought about the following disadvantages:

(1) Since the coating of the surface layer is dried and formed into a compact film at the baking step, the solvent or water left in the lower coating layer is inhibited from evaporation and such undesirable phenomena as blistering, cracking and formation of pin holes are caused.

(2) Since a solvent type paint or water-soluble paint contains a considerable amount of an organic solvent, if it is applied to an undried coating in the non-fluid state, sagging, swelling and lifting are readily caused. This tendency is especially conspicuous when a lower layer coating is formed from a paint comprising a resin having a low cross-linking density, for example, an electrodeposition paint or a water-soluble paint, or from a paint having a high pigment content, for example, a corrosion-resistant paint.

Because of these disadvantages, a homogeneous coating is not formed and it is impossible to provide a practical coating excellent in effects of decorating and protecting a coated article.

If a powder paint is used for formation of a surface layer, the foregoing problems are solved, because such a paint does not contain an organic solvent and a solvent in the lower coating layer can evaporate through clearances among particles of the powder paint. However, since a special coating apparatus must be used for application of a powder paint, a coating line for ordinary paints cannot be used and the coating cost becomes high.

In addition to the foregoing paints, a so-called slurry paint comprising resin particles dispersed in water is known in the art. For example, there are known a paint formed by dispersing in water chlorinated polyether resin particles having a size smaller than 200 mesh (see the specification of U.S. Pat. No. 3,089,783) and a paint formed by dispersing chlorinated polyether resin particles in water containing a surfactant, an ester of a polyhydric alcohol with a lower aliphatic monocarboxylic acid, an alkaline water softener and a lower aliphatic alcohol (see the specification of U.S. Pat. No. 3,446,652).

As the method for applying such slurry paints, there are known a method comprising spray-coating a paint on an article to be coated, evaporating water from the coating and curing the coating to form a coating film (see the specification of U.S. Pat. No. 3,787,230) and a process comprising spray-coating an aqueous dispersion of nylon resin particles on an article to be coated which is maintained at a temperature higher than 100° C. (see the specification of U.S. Pat. No. 2,972,553).

These coating methods are not directed to formation of multi-layer coatings and according to these methods, it is difficult to shorten the time for the coating operation.

A process comprising spray-coating or roll-coating a topcoat paint on a coating of an undercoat paint in the fluid state has been used in the art for forming a special pattern of convexities and concavities or a special multicolor pattern.

According to this process, however, the smoothness and gloss of the resulting coating are degraded and therefore, it is impossible to obtain a multi-layer coating excellent in surface characteristics.

As will be apparent from the foregoing illustration, in the art there has not been known a multi-layer coating process capable of reducing the number of steps in the coating process, shortening the time for the coating operation and meeting general requirements of prevention of pollution and conservation of resources.

SUMMARY OF THE INVENTION

The present invention relates to a process for forming a multi-layer coating including at least two coating layers by performing the oven drying step at one time, which comprises applying a slurry paint comprising synthetic resin particles dispersed in an aqueous mediim, on an undried coating which is in the non-fluid state, to form a laminate coating and baking the laminate coating.

DETAILED DESCRIPTION OF THE INVENTION

It is a primary object of the present invention to provide a multi-layer coating process in which heat energy required for the coating operation is remarkably reduced.

Another object of the present invention is to provide a multi-layer coating process in which the time for the coating operation is remarkably shortened.

Still another object of the present invention is to provide a multi-layer coating process which discharges no pollutants such as exhaust gases and waste water, involves no risk of fire or explosion, enables recovery of lost paints, such as overspray mist in spray-coating or drips and tears in dip coating, and fully meets general requirements for prevention of pollution and conservation of resources.

The slurry paint that is used in the present invention is an aqueous dispersion type composition formed by dispersing synthetic resin particles having an average particle size of 0.5 to 80$\mu$ in an aqueous medium so that the solid content is 10 to 60% by weight, preferably 20 to 60% by weight.

The slurry paint has various merits such as mentioned below.

(a) In the slurry paint water constitutes the only or the major part of the volatile components. Accordingly, when the slurry paint is used as a topcoat, it does not cause any of dissolution, swelling or lifting of the undercoat layer. Further, since solvents in lower layers are allowed to evaporate at the oven drying step through clearances among particles of the upper coating layer of the slurry paint prior to melting of the resin particles and formation of a smooth coating surface, formation of such defects as blisters and pinholes can be prevented.

(2) Organic solvents, volatile basic substances or surface active agents are not contained in the slurry paint in large quantities. Accordingly, the slurry paint fully meets requirements of prevention of pollution and conservation of resources. Further, it provides coatings excellent in water resistance, chemical resistance and other properties.

(c) Since the solid content is as high as about 40 to about 60% by weight, a thick coating can be formed by one coating operation.

(d) A conventional coating apparatus for solvent type paints can be used for the slurry paint without any particular modification. Accordingly, customary coating procedures and equipment can be adopted and the coating operation can be performed at a low cost.

The slurry paint, however, has some defects that resin particles dispersed in an aqueous dispersion medium are readily precipitated and agglomerated during storage and cracking is readily caused in the resulting coating at the oven drying step.

In the slurry paint that is used in the present invention, in order to moderate or completely eliminate these defects, it is preferred that an ordinary water-soluble resin and/or an ordinary emulsion type resin be incorporated in amounts (as solids) of up to 30 parts by weight, especially up to 10 parts by weight, particularly especially up to 5 parts by weight, per 100 parts by weight of resin particles.

The slurry paint that is used in the present invention may further comprise appropriate amounts of additives such as a flow modifier, a surface active agent, a coated surface wetting agent, a thickener, a delustering agent and a rust inhibitor.

According to need, inorganic and organic coloring and extender pigments may be incorporated in the slurry paint that is used in the present invention. These pigments are dispersed in either or both of the resin particles and the aqueous medium and kneaded therewith. A metallic or high brilliance coating can be prepared from a slurry paint comprising a dispersed flaky aluminum pigment of finely crystalline flaky pigment in an amount of 0.05 to 30 parts by weight per 100 parts by weight of the resin particles.

In view of the smoothness of the resulting coating, the adaptability to the coating operation and the storage stability, the particle size of synthetic resin particles to be used for formation of a slurry paint in the present invention must be adjusted below 80$\mu$. Further, in order to prevent surface drying of the coating and occurrence of sagging in the coating, the particle size must be larger than 0.5$\mu$. Use of synthetic resin particles having a size of 4 to 30$\mu$ is especially preferred.

In order to prevent agglomeration and cohesion of resin particles, it is required for the resin particles to have a softening point higher than 5° C. Further, in order for the resin particles to melt and form a film at a heating temperature of 80° to 240° C., they must have a softening point not exceeding 120° C.

Resin particles having a softening point higher than 50° C. are especially preferred because at the oven drying step they retain a sufficient gas permeability prior to melting to form a smooth film and allow solvents in lower coating layers to evaporate efficiently.

As the resin constituting resin particles that are used in the present invention, there can be mentioned, for example, epoxy resins, amine-modified resins, phenolic resins, urea resins, saturated polyester resins, polyether resins, unsaturated polyester resins, blocked isocyanate resins, melamine resins, acrylic resins, alkyd resins, and derivatives and mixtures thereof. As the above-mentioned water-soluble and emulsion resin that may be incorporated into the slurry paint, there can be mentioned, for example, alkyd resins, vinyl acetate resins, ethylene-vinyl acetate copolymers, vinyl acetate-acrylic monomer copolymers, melamine resins, acrylic resins, polyester resins, polyether resins, urea resins, styrene-butadiene copolymers, polyvinyl butyral resins, epoxy resins, polybutadiene resins, phenolic resins, and derivatives and mixtures thereof.

The term "resin composition" in the present invention means (1) essential particle-constituting resins or (2)

a composition comprising the essential particle-constituting resins and a water-soluble resin or an emulsion resin.

If both the water-dilutable resin and the resin particles are thermoplastic and two or more functional groups capable of reacting with one another are not contained in the resinous composition, it has thermoplastic characteristics. When at least two functional groups capable of reacting with each other are contained in the resinous composition, for example, in the case of such combinations as phenolic resin-epoxy resin, epoxy resin-melamine resin, acrylic resin-blocked isocyanate resin, acrylic resin-melamine resin, polyester resin-melamine resin, polyester resin-blocked isocyanate resin, alkyd resin-amino resin, alkyd resin-phenolic resin, epoxy resin-amine modified resin, epoxy resin-curing agent and acrylic resin-curing agent, the resinous composition has thermosetting characteristics.

In case at least two functional groups capable of reacting with each other are contained in the resinous composition, the thermosetting reaction may occur in two or more kinds of resin particles, in two or more kinds of water-dilutable resins or between the resin particles and the water-dilutable resin, or in two or more of these in combination. Resin particles or water-dilutable resin having no functional group capable of causing the curing reaction may be incorporated in such combination of the resin.

The mixing ratio of the resins participating in the curing reaction may be adjusted appropriately. For example, in case a thermosetting resin composition is used as the water-dilutable resin, it is preferred that 10 to 70 parts by weight of a water-soluble aminoplast resin be combined with 100 parts by weight of at least one member selected from acrylic resins and alkyd resins having an acid value of 30 to 80. In this case, the resin particles may be thermoplastic or thermosetting.

In the case of thermosetting resinous composition comprising a water-dilutable resin and resin particles capable of reacting with each other, it is preferred that a water-soluble aminoplast resin be used as the water-dilutable resin, particles of an acrylic resin having a hydroxyl value of 0.05 to 100, an acid value of 5 to 30 and a number average molecular weight of about 3000 to about 35000 be used as the resin particles and the aminoplast resin be incorporated in an amount of 0.5 to 100% by weight, especially 1 to 30% by weight, based on the resin particles. In this case, it is especially preferred that the resin particles comprise at least 30% by weight of the acrylic resin.

When the resin particles used are thermosetting, at least two kinds of resins capable of reacting with each other or a thermosetting resin and a curing agent may be present in the respective particles. Alternately, they may be formed into two different kinds of particles and they may be used in the form of a mixture. In this case, the water-dilutable resin are thermosetting.

Preferred resin combinations capable of causing the curing reaction are as follows:

(i) A composition comprising an acrylic resin having a hydroxyl value of 20 to 120 and a number average molecular weight of 3000 to 35000 and a blocked isocyanate resin at a weight ratio of from 100/5 to 100/100, preferably from 100/10 to 100/50, especially preferably a composition in which the blocked isocyanate resin has an isocyanate equivalent of 100 to 2000 and the mixing ratio of the acrylic resin and the blocked isocyanate resin is such that the ratio of the number of isocyanate groups to the number of hydoxyl groups is from 0.4 to 1.2.

(ii) A composition comprising an acrylic copolymer containing 0.5 to 30% by weight of glycidyl group-containing $\alpha,\beta$-ethylenically unsaturated monomer segments in the molecule and at least one member selected from dibasic acids, polybasic acids and acid anhydrides at a weight ratio of from 100/3 to 100/30, preferably from 100/5 to 100/20.

(iii) A composition comprising an acrylic copolymer containing 0.5 to 30% by weight of blocked isocyanate group-containing $\alpha,\beta$-ethylenically unsaturated monomer segments in the molecule and a polyhydric alcoholic hydroxyl group-containing compound at a weight ratio of from 100/5 to 100/100, especially preferably a composition in which the isocyanate equivalent of the blocked isocyanate group-containing copolymer is 100 to 2000 and the copolymer is mixed with the polyhydric alcoholic hydroxyl compound at such a ratio that the ratio of the number of isocyanate groups to the number of hydroxyl groups is from 0.4 to 1.2.

(iv) A composition comprising an epoxy resin having an epoxy equivalent of 400 to 5000 and a softening point of 40° to 120° C. and at least one member selected from amines, polybasic acids, aminoplast resins, imidazoles, acid anhydrides, blocked isocyanates, triazoles and dicyandiamine at a weight ratio of from 100/0.5 to 100/30.

(v) A composition comprising a polyester resin having a hydroxyl value of 30 to 100 and a softening point of 20° to 120° C. and at least one member selected from acid anhydrides and blocked isocyanates at a weight ratio of from 100/5 to 100/80, especially preferably a composition in which a blocked isocyanate resin having an isocyanate equivalent of 100 to 2000 is mixed with the polyester resin at such a mixing ratio that the ratio of the number of isocyanate groups to the number of hydroxyl groups is from 0.4 to 1.2.

(vi) A composition comprising an acrylic resin having a hydroxyl value of 0.05 to 100, an acid value of 5 to 30 and a number average molecular weight of 3000 to 35000 and an aminoplast resin, preferably a methylolated product of urea, benzoguanamine or melamine, a methyl-etherified or butyl-etherified product of such methylolated product or a mixture of two or more of these condensates, at an acrylic resin/aminoplast resin mixing weight ratio of from 100/10 to 100/100, preferably from 90/10 to 50/50.

In the instant specification and claims, by the expression "undried coating in the non-fluid state" indicating the degree of drying in the coating is meant a coating which is formed by ordinary spray coating, dip coating, electrostatic coating, roller coating or shower coating of a known-water-soluble paint, emulsion paint, solvent type paint or slurry paint or by electro-deposition coating of an electro-deposition paint or slurry paint and which is rendered non-flowing by setting or pre-heating but is still in the undried state, namely in the stage before complete drying and formation of a dry film. In case of a powder paint, a coating formed by electrostatic coating but not yet heated for formation of a film is meant.

In other words, the above expression means the state of the coating wherein the coating is not made to flow by a pressure imposed on the surface thereof when the slurry paint is applied thereto. This pressure corresponds to an air pressure in case of spray coating or to a shearing force in case of roller coating. Accordingly, the lower limit of the non-fluid state referred to in the present invention changes depending on the method for applying the slurry paint as the upper layer paint. In general, it is preferred that the degree of drying be that of the set-to-touch state or a higher drying degree.

When an organic solvent type paint is used for formation of a lower coating layer, in order to prevent the slurry paint applied as the upper layer from being repelled by the lower coating layer, it is preferred that the lower coating layer be in such a state that the amount of the organic solvent left in the lower coating layer is smaller than 5% by weight.

When a water-soluble paint, an emulsion resin paint or slurry paint is used as the lower layer-forming paint, if a suitable amount of water is contained in the lower coating layer, the slurry paint applied as the upper layer easily adheres to the lower coating layer, and it is preferred that the content of the volatile component left in the lower coating layer be 3 to 30% by weight.

In the present invention, it is possible to adopt an embodiment in which after the slurry paint has been applied to a lower coating layer and while it is in the non-fluid state, application of the slurry paint is repeated several times to increase the number of layers in the coating.

The so prepared coating including at least two layers is heated at a temperature higher than the film-forming temperature of the coating just after formation of the coating or preliminary drying of the upper layer by setting or pre-heating. By the term "the film-forming temperature of the coating" is meant a highest temperature among film-forming temperature of respective coating layers.

The effects and advantages attained by the present invention are as follows:

TABLE III

| Product | Dose mg/kg × 6 j. | P. 100 of survival at 6th day Diplococcus | Streptococcus |
|---|---|---|---|
| Control | 0 | 0 | 0 |
| Composition of | 200 | 50 | 70 |
| Composition of | 200 | 50 | 70 |
| Example 2 | 400 | 100 | 100 |
| Midecamycine | 200 | 20 | 40 |
| | 400 | 80 | 100 |

(1) Formation of a multi-layer coating including at least two coating layers can be performed by conducting oven drying at one time and a coating film is obtained only by one oven drying operation. Accordingly, the coating process can be simplified, the scale of the coating equipment can be reduced, energy necessary for baking can be remarkably reduced, and it is possible to lower the coating cost.

(2) In the conventional multi-layer coating process, in order to attain sufficient adhesion between the heated and hardened layer and the layer to be applied thereon, it is necessary to perform an intermediate treatment such as sanding the surface of the hardened coating. In the present invention, since respective layers are heated and hardened at one time, the sanding treatment becomes unnecessary and a sufficient intercoat, adhesion strength can be obtained between every two adjacent layers.

The present invention will now be described in detail by reference to the following Examples, in which all of "parts" and "%" are by weight unless otherwise indicated.

Paints used in these Examples were prepared according to the following methods.

(Preparation of Electro-Deposition Paint A).

In a nitrogen current, 40 parts of an epoxy resin (manufactured and sold under the tradename "Epikote #828" by Shell Chemicals Co., Ltd.) and 100 parts of linseed oil fatty acid were heated and agitated at 230° C. for 3 hours to obtain an epoxy ester resin having an acid value of 10. Then, 20 parts of maleic anhydride was added to this epoxy ester resin and the mixture was heated and agitated at 180° C. for 4 hours to obtain a maleinized epoxy ester resin having an acid value of 140. Then, 100 parts of isopropyl alcohol was added to the resin to dissolve it therein, 38 parts of diethanol amine was then added to effect partial neutralization, and 102 parts of water was added to obtain a water-dispersible resin composition having a pH of 7.8 and a resinous non-volatile component content of 40%. Then, 100 parts of this water-dispersible resin composition was mixed and kneaded with 6 parts of titanium dioxide, 2 parts of red iron oxide, 2 parts of china clay, 0.4 part of carbon black and 1.2 parts of strontium molybdate to form an electro-deposition paint A.

(Preparation of Slurry Paint B)

A mixture of 20 parts of ethyl acrylate, 10 parts of lauryl methacrylate, 55 parts of styrene and 15 parts of glycidyl acrylate was polymerized according to a customary method to obtain a copolymer having a softening point of about 40° C. and a number average molecular weight of about 5500. Then, 94 parts of this copolymer was heated, molten and kneaded with 6 parts of trimellitic acid, 18 parts of titanium dioxide and 2 parts of Phthalocyanine Blue. The resulting mixture was mechanically pulverized to obtain resin particles having a size smaller than 200 mesh. Then, 120 parts of the pulverized resin was added to a solution formed by dissolving 0.2 part of a non-ionic surface active agent homogeneously in 120 parts of water, and the mixture was sufficiently agitated in such a manner that bubbling did not take place. Then, the resin particles were further pulverized in a ball mill so that the particle size was smaller than 10μ. Then, 0.8 part of a thickener and 45 parts of water were added to the above resin composition to obtain a slurry paint B having the viscosity adjusted to one suitable for spray coating.

(Water-Soluble Paint C)

In a nitrogen current, 456 parts of tall oil fatty acid, 264 parts of isophthalic acid, 87 parts of trimellitic anhydride, 277 parts of trimethylol propane and 40 parts of xylol were subjected to condensation under reflux at 240° C. for 6 hours. When the amount of water isolated with advance of the reaction was 84 parts and the acid value of the resulting resin was 58.5, 40 parts of xylol was removed by distillation. Then, the temperature was lowered to 180° C. and 95 parts of trimethyl amine and 248 parts of ethylene glycol monomethyl ether acetate were added to the residue, and the mixture was cooled to 90° C. Then, 270 parts of water was added to the mixture and the resulting mixture was sufficiently agitated. Then, 0.2 part of a surface adjusting agent was added to 100 parts of the resulting aqueous resin solution to obtain a water-soluble paint having a non-volatile component content of 64% and a pH of 7.8.

(Preparation of Slurry Paint D)

A mixture of 83 parts of an epoxy resin having an epoxy equivalent value of 450 to 535 and a softening point of 64° to 76° C. (manufactured and sold under the tradename "Epikote #1001" by Shell Chemicals Co. Ltd.), 1 part of 2-phenylimidazole, 13 parts of tetrahydrophthalic anhydride, 20 parts of titanium dioxide and 2 parts of Phthalocyanine Blue was melted and kneaded homogeneously. The resulting mixture was mechanically pulverized to obtain resin particles having a size smaller than 120 mesh. Then, an aqueous solution having a pH of 7 and a viscosity of 6000 cps, which was formed by dissolving 0.1 part of a polyacrylic acid type thickener in a solution of 0.2 part of triethyl amine in 50 parts of water, was added to 50 parts of the above pulverized epoxy resin and the pulverized resin was homogeneously dispersed in the aqueous solution to obtain a slurry paint D.

(Preparation of Emulsion Paint E)

With 1.5 part of dimethyl ethanolamine was neutralized 128 parts of a carboxyl group-containing resin emulsion having a non-volatile component content of 50%, a viscosity of 3500 cps, a pH of 2.0 and a lowest film-forming temperature of 50° C. (manufactured and sold under the tradename "Yodo Sol 32A108" by Kanebo-NSC Co., Ltd.), and the neutralized emulsion was homogeneously mixed and kneaded with 20 parts of water soluble aminoplast resin manufactured and sold under the tradename "Sumimal M-40W" by Sumitomo Chemical Co., Ltd.), 20 parts of water, 20 parts of titanium dioxide and 8.7 parts of a film-forming assistant to obtain a white emulsion paint E having a pH of 8.5.

(Preparation of Slurry Paint F)

In a mixed solvent comprising 30 parts of ethyleneglycol monobutyl ether and 30 parts of isopropyl alcohol, a mixture of 30 parts of isobutyl methacrylate, 30 parts of 2-ethylhexyl methacrylate and 40 parts of styrene was subjected to dropping polymerization according to a customary method to obtain a solution containing a resin having a softening point of about 50° C. Then, 10 parts of this resin solution was added dropwise to 800 parts of water being agitated at a high speed to transfer the solvent in the resin solution into water to form resin particles having an average particle size of about 60μ. Filtration and water washing of the resin particles were repeated several times to recover resin particles having a solid content of 65%. Then, 30 parts of water and 0.2 part of an anionic surface active agent were added to 100 parts of the recovered resin particles to obtain a homogeneous resin particle dispersion. Separately a pigment dispersion was prepared by adding 50 parts of water and 0.5 part of an anionic surface agent to 50 parts of a flaky aluminum pigment (manufactured and sold under the tradename "Stapa Mobil R607" by Eckartwerke Co.). Then, 10 parts of the so prepared pigment dispersion was added to 100 parts of the above resin particle dispersion and the mixture was blended homogeneously to form a slurry paint F.

(Preparation of Slurry Paints G and H)

To 100 parts of the above-mentioned slurry paint B was added 37 parts or 4.2 parts of the water-dispersible resin having a non-volatile component of 40%, which was used for formation of the above-mentioned electro-deposition paint A to obtain a slurry paint G or H.

(Preparation of Slurry Paints I and J)

To 100 parts of the above-mentioned slurry paint D were added 37 parts or 3 parts of the above-mentioned water-soluble paint C and 9 parts or 1 part of water, and the mixture was homogeneously agitated to obtain a slurry paint I or J.

(Preparation of Powder Paint K)

The epoxy resin particles used for formation of the above-mentioned slurry paint A were further pulverized mechanically and classified to obtain a powder paint K capable of passing through a 18-mesh sieve.

EXAMPLE 1

To 100 parts of the electro-deposition paint A was added 100 parts of water, and the mixture was homogeneously agitated to adjust the viscosity to a value suitable for coating. A zinc phosphate-treated soft steel plate (hereinafter referred to as "soft steel plate") was dipped in the resulting paint and a voltage of 70 volts was applied to the soft steel plate for 3 minutes at 30° C. to effect electro-deposition coating. Immediately after completion of the electro-deposition coating, the resulting coating was rinsed with water, and subjected to setting in still condition. When the weight of the so prepared coating was compared with the weight of the coating prepared under the same conditions and completely dried, it was found that the so prepared coating had a volatile component content of 10%. It also was confirmed that the dry film thickness was 20μ. The slurry paint B was spray-coated on this coating, and the multi-layer coating was pre-heated at 80° C. for 10 minutes and then baked at 160° C. for 30 minutes to obtain a two-layer finish coating having a thickness of 65μ.

EXAMPLE 2

To 100 parts of the water-soluble paint C were added 20 parts of a water-soluble melamine resin (manufactured and sold under the tradename "Sumimal M-30W" by Sumitomo Chemical Co., Ltd.) and 15 parts of water, and the mixture was homogeneously agitated and blended to adjust the viscosity. The resulting paint was roller-coated on a tinplate having a thickness of 0.3 mm and pre-heated at 120° C. for 30 seconds to obtain a set-to-touch coating.

In the same manner as described in Example 1, it was confirmed that the volatile component content in the coating was 13% and the dry film thickness was 15μ.

The viscosity of the slurry paint D was adjusted by adding 11 parts of water to 100 parts of the slurry paint D, and the paint was dip-coated on the tinplate having the set-to-touch coating. The coated tinplate was allowed to stand for 10 minutes to remove drips, pre-heated at 90° C. for 5 minutes and baked at 180° C. for 10 minutes to form a two-layer finish coating having a thickness of 27μ.

EXAMPLE 3

To 100 parts of the emulsion paint E was added 34 parts of water to adjust the viscosity, and the paint was spray-coated on a soft steel plate and the coating was allowed to stand still for 15 minutes to obtain a set-to-touch coating.

In the same manner as described in Example 1, it was confirmed that the volatile component content in the coating was 8% and the dry film thickness was 15μ.

To 100 parts of the slurry paint F was added 5 parts of water to adjust the viscosity, and the paint was spray-coated on the set-to-touch coating. The resulting coating was allowed to stand still for 3 minutes to dry it in the non-fluid state. In the same manner as described in Example 1, it was confirmed from the weight difference that the volatile component content in this non-fluid coating was 30%. To 100 parts of the slurry paint J was added 8 parts of water to adjust the viscosity, and the paint was spray-coated to the above non-fluid coating and the coating was baked at 150° C. for 20 minutes to obtain a 3-layer metallic finish coating having a thickness of 50μ.

EXAMPLE 4

The powder paint K was applied to a soft steel plate in an amount of 60 g/m² and the slurry paint H was applied thereto according to the curtain flow coating method. The coating was allowed to stand still for 15 minutes to obtain a set-to-touch coating, and this coating was then pre-heated at 90° C. for 10 minutes and baked at 170° C. for 25 minutes to obtain a two-layer finish coating having a thickness of 70μ.

EXAMPLE 5

To 100 parts of a melamine-alkyd resin paint (manufactured and sold under the tradename "Delicon # 800 White" by Dai Nippon Toryo Co., Ltd.) was added 30 parts of a mixed solvent comprising 80% of an aromatic solvent and 20% of a polar solvent to adjust the viscosity of the paint. Then, the paint was spray-coated on a soft steel plate and the coating was allowed to stand still for 15 minutes to obtain a set-to-touch coating. In the same manner as described in Example 1, it was confirmed that the volatile component content in this coating was 4% and the dry film thickness was 17μ. The slurry paint J was roller-coated on the set-to-touch coating and baked at 170° C. for 25 minutes to obtain a two-layer finish coating having a thickness of 37μ.

COMPARATIVE EXAMPLE 1

The viscosity-adjusted melamine-alkyd resin paint used in Example 5 was spray-coated on the coating of the electro-deposition paint A which was formed under the same conditions as described in Example 1, and the coating was pre-heated at 110° C. for 60 seconds and baked at 170° C. for 20 minutes to obtain a two-layer finish coating having a thickness of 37μ.

COMPARATIVE EXAMPLE 2

A paint formed by homogeneously mixing 100 parts of the slurry paint G with 25 parts of water was applied to a set-to-touch coating of the water-soluble paint C, which was prepared in the same manner as described in Example 2, according to the curtain flow coating method, and the coating was allowed to stand still for 10 minutes to remove drips and obtain a set-to-touch coating. Then, this coating was pre-heated at 90° C. for 5 minutes and baked at 180° C. for 10 minutes to obtain a two-layer finish coating having a thickness of 27μ.

COMPARATIVE EXAMPLE 3

A paint formed by homogeneously mixing 100 parts of the water-soluble paint C with 25 parts of water was shower-coated on a set-to-touch coating of the emulsion paint E, which was formed in the same manner as described in Example 3. The coating was allowed to stand still for 10 minutes to remove drips, and then, the coating was baked at 150° C. for 20 minutes to obtain a two-layer finish coating having a thickness of 30μ.

COMPARATIVE EXAMPLE 4

A paint formed by homogeneously mixing 100 parts of the emulsion paint E with 7 parts of water was roller-coated in a set-to-touch coating of the melamine-alkyd resin paint which was formed in the same manner as described in Example 5, and the coating was baked at 170° C. for 25 minutes to obtain a two-layer finish coating having a thickness of 32μ.

COMPARATIVE EXAMPLE 5

A soft plate having a coating of the electro-deposition paint A, which was formed in the same manner as described in Example 1, was dipped in the slurry paint I and allowed to stand still for 10 minutes to remove drips. The coating was then baked at 160° C. for 30 minutes to obtain a two-layer finish coating having a thickness of 35μ.

The coating operation adaptability and properties of the resulting multi-layer finish coating in each of the foregoing Examples and Comparative Examples are collectively shown in Table 1.

Table 1

| Example No. | Coating[1] Operation Adaptability | Coated[2] Surface Condition | Properties of Coating: Gloss[3] | Adhesion[4] | Water[5] Resistance | Moisture[6] Resistance | Salt Spray[7] Resistance |
|---|---|---|---|---|---|---|---|
| 1 | good | not changed | 91 | 100/100 | not changed | not changed | not changed |
| 2 | " | " | 90 | 100/100 | " | " | " |
| 3 | " | " | 87 | 100/100 | " | " | " |
| 4 | " | " | 92 | 100/100 | " | " | " |
| 5 | " | " | 90 | 100/100 | " | " | " |
| Comparative Example 1 | cissing | cissing insufficient smoothness | 68 | 95/100 | partially swollen | partially swollen | rusting from cissing |
| Comparative Example 2 | good | partial blister and pinholes | 91 | 92/100 | blister | blister | spot ruste |
| Comparative Example 3 | lifting | blister | 90 | 65/100 | swollen and softened | swollen and softened | " |
| Comparative Example 4 | cissing | cissing | 86 | 80/100 | partially swollen | partially swollen | rusting from cissing |
| Comparative | | | | | | | |

Table 1-continued

| Example No. | Coating[1)] Operation Adaptability | Coated[2)] Surface Condition | Properties of Coating Gloss[3)] | Adhesion[4)] | Water[5)] Resistance | Moisture[6)] Resistance | Salt Spray[7)] Resistance |
|---|---|---|---|---|---|---|---|
| Example 5 | good | partial blister | 92 | 90/100 | blister | blister | spot rusts |

Notes
[1)]Occurence of sagging,cissing, swelling and lifting was examined with the naked eye.
[2)]Occurrence of blistering, pinhole formation and cissing was examined with the naked eye.
[3)]60°/60° specular gloss value.
[4)]Cross-cut adhesion test (11 parallel cut at in intervals of 2 mm reacting the substrate were made on the coating in both the lateral and longitudinal directions to form 100 cut squares, an adhesive tape was applied thereto, the applied tape was violently peeled from one end, and the number of cut square left on the substrate was examined).
[5)]The condition of the coating surface after dipping in water for 72 hours.
[6)]The salt spray test was conducted for 120 hours according to the method of JIS K-5400, 7.8.

What is claimed is:

1. A process for forming a multi-layer coating including at least two layers on a metal substrate which comprises applying to said substrate a lower coating layer, which is a paint selected from the group consisting of water soluble paints, emulsion paints, slurry paints and organic solvent dilution type paints, partially drying said coating layer to a non-flowing, at least set-to-touch state, the amount of the volatile component left in the lower coating layer being (a) not higher than 5% by weight in the case of an organic solvent dilution type paint, and (b) between 3 and 30% by weight in the case of a water soluble paint, emulsion resin paint and slurry paint, then applying thereon at least once a slurry paint consisting of thermosetting synthetic resin particles to form a laminate coating, the slurry paint comprising 10 to 70% by weight of resin particles dispersed in a medium composed mainly of water, said resin particles having an average particle size of 4 to 30 microns and a softening point of 5° to 120° C., and baking the resulting laminate coating at a temperature higher than the film-forming temperature of the coating layer having the highest film-forming temperature among respective coating layers.

2. A process according to claim 1 wherein the slurry paint comprises 20 to 60% by weight of resin particles dispersed in a medium composed mainly of water, said resin particles having a softening point of 50° to 120° C.

3. A process according to claim 1 wherein said slurry paint containing up to 30 parts by weight of at least one menber selected from the group consisting of emulsion resins and water-soluble resins per 100 parts by weight of said resin particles.

4. A process according to claim 1 wherein said slurry paint comprises 0.05 to 30% by weight of a flaky aluminum pigment.

5. The process according to claim 1 wherein the substrate is a steel plate, the lower coating layer from an aqueous dispersion of maleinized epoxy ester resin is applied thereon, the coated steel plate is dried to a volatile component content of 10%, a slurry paint from a copolymer of ethyl acrylate, lauryl methacrylate, styrene and glycidyl acrylate is applied to form a laminate coating and the coated steel plate is baked at 160° C.

6. The process according to claim 1 wherein the substrate is a tin plate, the lower coating layer from an aqueous dispersion of melamine resin and the polymer from isophthalic acid, trimellitic anhydride, trimethylol propane is applied thereon, the coated tin plate is dried to a volatile component content of 13% and a slurry paint from an epoxy resin and tetrahydrophthalic anhydride is applied to form a laminate which is baked at 180° C.

7. The process according to claim 1 wherein the substrate is a steel plate, the lower coating layer from an aqueous dispersion of dimethyl ethanolamine and carboxyl containing resin emulsion is applied thereon, the coated steel plate is dried to a non-flowing, set-to-touch state and a slurry paint from a copolymer from ethyleneglycol monobutyl ether, isobutyl methacrylate, 2-ethylhexyl methacrylate and styrene is applied to a non-flowing, set-to-touch state, a slurry paint from an epoxy resin and tetrahydrophthalic anhydride mixed with the slurry paint from isophthalic acid, trimellitic anhydride and trimethylolpropane is applied and the laminate is baked at 150° C.

8. The processes according to claim 1 wherein the substrate is a steel plate, the lower coating layer from an aqueous dispersion of a maleinized epoxy ester resin is applied thereon, the coated steel plate is dried to a non-flowing set-to-touch state, and a slurry paint from a copolymer of ethyl acrylate, lauryl methacrylate, styrene and glycidyl acrylate mixed with a slurry paint from a maleinized epoxy ester resin is applied to form a laminate which is baked at 170° C.

9. The process according to claim 1 wherein the substrate is a steel plate, the lower coating layer from an aqueous dispersion of a melamine alkyd resin is applied thereon, the coated steel plate is dried to a non-flowing, set-to-touch state, a slurry paint from an epoxy resin and tetrahydrophthalic anhydride mixed with the slurry paint from isophthalic acid, trimellitic anhydride and trimethylolpropane is applied and the laminate is baked at 170° C.

* * * * *